United States Patent [19]

Töpker

[11] Patent Number: 6,136,266
[45] Date of Patent: Oct. 24, 2000

[54] SOFT, LOW CARBON STEEL ALLOY WITH INCREASED DEFORMABILITY FOR STRUCTURAL REINFORCEMENT PARTS OF MOTOR VEHICLES

[75] Inventor: Dieter Töpker, Paderborn, Germany

[73] Assignee: Benteler AG, Paderborn, Germany

[21] Appl. No.: 09/413,151

[22] Filed: Oct. 6, 1999

[30] Foreign Application Priority Data

Oct. 13, 1998 [DE] Germany ................ 298 18 244 U

[51] Int. Cl.$^7$ ........................... C22C 38/22; C22C 38/12
[52] U.S. Cl. ........................... 420/106; 420/110; 420/111
[58] Field of Search ................... 420/106, 110, 420/111

[56] References Cited

U.S. PATENT DOCUMENTS

| | | | |
|---|---|---|---|
| 4,400,225 | 8/1983 | Ishikawa et al. | 148/36 |
| 4,406,713 | 9/1983 | Yutori et al. | 148/12 |
| 4,992,239 | 2/1991 | Khare | 420/104 |
| 5,211,909 | 5/1993 | Iseda et al. | 420/106 |
| 5,403,410 | 4/1995 | Shikanai et al. | 148/328 |
| 5,407,635 | 4/1995 | Iseda et al. | 420/110 |
| 5,746,843 | 5/1998 | Miyata et al. | 148/335 |
| 5,814,274 | 9/1998 | Komai et al. | 420/106 |
| 5,855,846 | 6/1999 | Beguinot et al. | 420/121 |
| 5,945,064 | 8/1999 | Komai et al. | 420/40 |

*Primary Examiner*—Daniel J. Jenkins
*Assistant Examiner*—Nicole Coy
*Attorney, Agent, or Firm*—Friedrich Kueffner

[57] ABSTRACT

A steel alloy for pipes, sheet metal or sections for manufacturing body reinforcements for motor vehicles, particularly side impact beams or A- and B-column reinforcements, wherein the steel alloy contains in percent by weight 0.1 to 0.17% carbon, 2.0 to 2.8% manganese, 0.4 to 0.8% chromium, 0.1 to 0.35% molybdenum, 0.03 to 0.07% aluminum, 0.002 to 0.003% boron, 0.0001 to 0.005% titanium, 0.08 to 0.012% vanadium, 0.025 to 0.06% niobium, 0.0001 to 0.10 zirconium, 0.01 to 0.05% nitrogen, up to 0.3% silicon, up to 0.025% phosphorus and % 0.010 sulfur, wherein the remainder is iron including impurities caused by smelting, and wherein the sum of the alloy components titanium, vanadium and niobium is between 0.16 and 0.25%.

3 Claims, No Drawings

SOFT, LOW CARBON STEEL ALLOY WITH INCREASED DEFORMABILITY FOR STRUCTURAL REINFORCEMENT PARTS OF MOTOR VEHICLES

BACKGROUND OF THE INVENTION

1. Field of the Invention

The present invention relates to a steel alloy for pipes, sheet metal or sections for manufacturing body reinforcements for motor vehicles, particularly side impact beams or A- and B-column reinforcements. The present invention also relates to a side impact beam or A- and B-column reinforcements manufactured from the steel alloy.

2. Description of the Related Art

Body reinforcements serve for the passive passenger protection in motor vehicles. They are subjected to high stresses particularly in the case of side impact crashes and front impact crashes. Accordingly, it is desired that components such as side impact beams or A- and B-column reinforcements have a high deformation capability for energy dissipation and absorption. This can be achieved by the mechanical characteristics of the material of the structural components. Normally, the strength and toughness required of the structural component are adjusted by the thermal treatment which follows the manufacture. can be achieved by the mechanical characteristics of the material of the structural components. Normally, the strength and toughness required of the structural component are adjusted by the thermal treatment which follows the manufacture.

U.S. Pat. No. 4,406,713 discloses a steel of high strength and toughness, preferably for manufacturing wires or rods, wherein the steel contains 0.05 to 0.3% carbon, 0.3 to 2.5% manganese, up to 1.5% silicon and at least one carbide former and nitrite former from the group of niobium, vanadium, titanium and zirconium. After austenitizing, this steel is quenched in such a way that it contains between 5 and 65% ferrite, and the remainder martensite.

When cold deforming such a martensite hardening steel which has an apparent yielding point of about 1,000 N/mm$^2$, the deforming tools are subjected to high stresses and increased wear. This has a disadvantageous effect on the production costs, particularly in mass produced articles such as body reinforcements of motor vehicles

SUMMARY OF THE INVENTION

Therefore, it is the primary object of the present invention to provide a steel alloy for pipes, sheet metal or sections for manufacturing body reinforcements of motor vehicles, wherein the steel alloy can be subjected to deformation in an advantageous manner, and wherein the steel alloy has a sufficiently high strength and a good energy dissipation property.

In accordance with the present invention, the steel alloy contains in percent by weight 0.1 to 0.17% carbon, 2.0 to 2.8% manganese, 0.4 to 0.8% chromium, 0.1 to 0.35% molybdenum, 0.03 to 0.07% aluminum, 0.002 to 0.003% boron, 0.0001 to 0.005% titanium, 0.08 to 0.012% vanadium, 0.025 to 0.06% niobium, 0.0001 to 0.10 zirconium, 0.01 to 0.05% nitrogen, up to 0.3% silicon, up to 0.025% phosphorus and % 0.010 sulfur, wherein the remainder is iron including impurities caused by smelting, and wherein the sum of the alloy components titanium, vanadium and niobium is between 0.16 and 0.25%.

The body reinforcements produced from pipes, sheet metal or sections of this steel alloy have a high strength with an apparent yielding point $R_e$ of 1,000 N/mm$^2$ and higher and an energy conversion capacity which meets the requirements to be made of these structural components. In the case of an impact, the body reinforcements provide a sufficient resistance to the introduced forces and a defined energy dissipation and work of deformation without breaking. This contributes significantly to the increase of the safety of the passenger cell of a motor vehicle.

The various features of novelty which characterize the invention are pointed out with particularity in the claims annexed to and forming a part of the disclosure. For a better understanding of the invention, its operating advantages, specific objects attained by its use, reference should be had to the descriptive matter in which there are described preferred embodiments of the invention.

DETAILED DESCRIPTION OF THE INVENTION

The components of the steel alloy are adjusted to each other in such a way that the required mechanical characteristics are achieved and the steel alloy or the pipes, sheet metal and sections manufactured from this steel alloy, can be cold deformed in an advantageous manner. The steel alloy is distinguished by a low abrasiveness or wear effect in the deforming tool during deformation. Consequently, the deforming tools are subjected to significantly lower mechanical loads. This measure leads to a significant increase of the service life of the deforming tools.

The steel according to the present invention is soft and is low in carbon. The lowered carbon content leads to a higher deformability in the austenitic structural state. The manganese content ensures a sufficiently high strength and hardening capacity. Moreover, the manganese has a favorable effect on the weldability. Also essential is the addition of zirconium which improves microhardening. Also contributing to the improved microhardening are the alloying components titanium, vanadium and niobium. Particularly advantageous has been found to be the ratio of titanium, vanadium and niobium which in the sum thereof is between 0.1 and 0.25% as provided by the analysis according to the present invention.

Another essential alloy component is chromium in connection with molybdenum, aluminum and boron. Chromium increases the strength. Molybdenum increases the tensile strength, particularly the hot strength, and has an advantageous effect on weldability. The addition of aluminum supports the formation of fine grain. Finally, nitrogen has to be mentioned whose content has an influence on the required properties of the steel alloy. The affinity to titanium, vanadium, zirconium and aluminum results in a finer structure which has a positive effect on the energy conversion capability of the body reinforcements manufactured from the steel alloy.

The steel alloy has an optimized toughness for the intended purpose of the steel alloy. Moreover, the steel alloy has a good deformability and weldability. This provides the additional advantage that, in addition to using the steel alloy for seamless pipes, it is also possible to manufacture pipes with longitudinal welding seams which are sometimes better suitable for the intended further processing. Of course, the sheet metal and sections manufactured from the steel alloy according to the present invention, are also used for further processing.

The adjustment of the mechanical characteristics is based on the alloying components and the specifically targeted deformation temperature during rolling into hot-rolled strip. In this connection, a reeling temperature is selected in such a way that a temperature $T \leq 480°$ C. at the reel can be realized in the finishing pass. In this manner, through the interaction between the elements, such as chromium, molybdenum, titanium or niobium which act to increase the strength, on the one hand, and nitrogen, on the other hand, it is possible to produce a completely martensitic structure. This is due to the fact that the steel alloy has a low carbon content, but still a good deformability for a strength level of >1,200 N/mm². The ratio of Re/Rm is at ≦0.7.

A side impact beam, as well as an A-column or B-column reinforcement manufactured from the steel alloy have the strength required when used in motor vehicles, while having a high deformation capability provided by energy dissipation. This contributes significantly to the safety of the passenger cell of a motor vehicle.

The invention is not limited by the embodiments described above which are presented as examples only but can be modified in various ways within the scope of protection defined by the appended patent claims.

I claim:

1. A body reinforcement for motor vehicles manufactured from a steel alloy, the steel alloy comprising as alloy components in percent by weight

| Carbon | (C) | 0.10 to 0.17% |
|---|---|---|
| Manganese | (Mn) | 2.00 to 2.80% |
| Chromium | (Cr) | 0.40 to 0.80% |
| Molybdenum | (Mo) | 0.10 to 0.35% |
| Aluminum | (Al) | 0.03 to 0.07% |
| Boron | (B) | 0.002 to 0.003% |
| Titanium | (Ti) | 0.0001 to 0.05% |
| Vanadium | (V) | 0.08 to 0.12% |
| Niobium | (Nb) | 0.025 to 0.06% |
| Zirconium | (Zn) | 0.0001 to 0.10% |
| Nitrogen | (N) | 0.01 to 0.05% |
| Silicon | (Si) | max. 0.3% |
| Phosphorus | (P) | max. 0.025% |
| Sulfur | (S) | max. 0.010%, | wherein a remainder is iron including impurities caused by smelting, and wherein a sum of the alloy components titanium, vanadium and niobium is between 0.16 and 0.25%.

2. A side impact beam for motor vehicles manufactured from a steel alloy which is comprised in percent by weight of

| Carbon | (C) | 0.10 to 0.17% |
|---|---|---|
| Manganese | (Mn) | 2.00 to 2.80% |
| Chromium | (Cr) | 0.40 to 0.80% |
| Molybdenum | (Mo) | 0.10 to 0.35% |
| Aluminum | (Al) | 0.03 to 0.07% |
| Boron | (B) | 0.002 to 0.003% |
| Titanium | (Ti) | 0.0001 to 0.05% |
| Vanadium | (V) | 0.08 to 0.12% |
| Niobium | (Nb) | 0.025 to 0.06% |
| Zirconium | (Zn) | 0.0001 to 0.10% |
| Nitrogen | (N) | 0.01 to 0.05% |
| Silicon | (Si) | max. 0.3% |
| Phosphorus | (P) | max. 0.025% |
| Sulfur | (S) | max. 0.010%, | wherein a remainder is iron including impurities caused by smelting, and wherein a sum of the alloy components titanium, vanadium and niobium is between 0.16 and 0.25%.

3. An A- and B-column reinforcement for motor vehicles manufactured from a steel alloy which is comprised in percent by weight of

| Carbon | (C) | 0.10 to 0.17% |
|---|---|---|
| Manganese | (Mn) | 2.00 to 2.80% |
| Chromium | (Cr) | 0.40 to 0.80% |
| Molybdenum | (Mo) | 0.10 to 0.35% |
| Aluminum | (Al) | 0.03 to 0.07% |
| Boron | (B) | 0.002 to 0.003% |
| Titanium | (Ti) | 0.0001 to 0.05% |
| Vanadium | (V) | 0.08 to 0.12% |
| Niobium | (Nb) | 0.025 to 0.06% |
| Zirconium | (Zn) | 0.0001 to 0.10% |
| Nitrogen | (N) | 0.01 to 0.05% |
| Silicon | (Si) | max. 0.3% |
| Phosphorus | (P) | max. 0.025% |
| Sulfur | (S) | max. 0.010%, | wherein a remainder is iron including impurities caused by smelting, and wherein a sum of the alloy components titanium, vanadium and niobium is between 0.16 and 0.25%.

* * * * *